(12) United States Patent
Ianev et al.

(10) Patent No.: US 12,185,232 B2
(45) Date of Patent: Dec. 31, 2024

(54) SUPPORT FOR NETWORK SLICE QUOTA EVENT NOTIFICATION

(71) Applicant: NEC Corporation, Tokyo (JP)

(72) Inventors: Iskren Ianev, Reading (GB); Toshiyuki Tamura, Tokyo (JP); Hassan Al-Kanani, Chinthurst (GB); Linghang Fan, Surrey (GB)

(73) Assignee: NEC CORPORATION, Tokyo (JP)

( * ) Notice: Subject to any disclaimer, the term of this patent is extended or adjusted under 35 U.S.C. 154(b) by 331 days.

(21) Appl. No.: 17/626,863

(22) PCT Filed: Apr. 26, 2021

(86) PCT No.: PCT/JP2021/016689
§ 371 (c)(1),
(2) Date: Jan. 13, 2022

(87) PCT Pub. No.: WO2021/225087
PCT Pub. Date: Nov. 11, 2021

(65) Prior Publication Data
US 2022/0264439 A1  Aug. 18, 2022

(30) Foreign Application Priority Data
May 8, 2020 (EP) .................................... 20173721

(51) Int. Cl.
*H04W 48/18* (2009.01)
*H04L 41/40* (2022.01)
*H04W 4/02* (2018.01)
*H04W 24/08* (2009.01)

(52) U.S. Cl.
CPC ............ *H04W 48/18* (2013.01); *H04L 41/40* (2022.05); *H04W 4/02* (2013.01); *H04W 24/08* (2013.01)

(58) Field of Classification Search
CPC ....... H04W 48/18; H04W 4/02; H04W 24/08; H04L 41/40
USPC .......................................................... 370/328
See application file for complete search history.

(56) References Cited

U.S. PATENT DOCUMENTS

| | | | |
|---|---|---|---|
| 11,303,527 B2* | 4/2022 | D'Acunto | H04W 48/18 |
| 12,052,657 B2* | 7/2024 | Garcia Martin | H04W 36/14 |
| 2019/0053147 A1* | 2/2019 | Qiao | H04W 48/18 |
| 2019/0191467 A1* | 6/2019 | Dao | H04W 76/11 |
| 2021/0014739 A1* | 1/2021 | Xin | H04L 47/2483 |
| 2021/0306842 A1* | 9/2021 | Rivas Molina | H04W 8/18 |

(Continued)

FOREIGN PATENT DOCUMENTS

WO  WO-2021070028 A1 *  4/2021  ......... H04L 43/0876

OTHER PUBLICATIONS

Network Slice Quota Management (Year: 2020).*

(Continued)

*Primary Examiner* — Mong-Thuy T Tran
(74) *Attorney, Agent, or Firm* — Sughrue Mion, PLLC

(57) ABSTRACT

The disclosure proposes solutions for network slice quota monitoring and management. It allows the Service Provider to subscribe with the 3GPP mobile network for network slice quota status notifications and retrieval and/or allows the Service Provider to allocate the initial network slice quota based on SLA (Service Level Agreement), to top-up or cut-down the allocated network slice quota when need and to re-balance it between network slices or between mobile networks.

4 Claims, 10 Drawing Sheets

(56) References Cited

U.S. PATENT DOCUMENTS

| | | | | |
|---|---|---|---|---|
| 2021/0306937 A1* | 9/2021 | Hua | ............... | H04W 8/183 |
| 2022/0159446 A1* | 5/2022 | Zhou | ............... | H04W 4/50 |
| 2022/0408293 A1* | 12/2022 | Han | ............... | H04W 28/16 |
| 2023/0030339 A1* | 2/2023 | Zhu | ............... | H04W 48/06 |
| 2023/0036993 A1* | 2/2023 | Velev | ............... | H04W 60/04 |
| 2023/0120144 A1* | 4/2023 | Kim | ............... | H04W 48/18 370/329 |
| 2023/0164668 A1* | 5/2023 | Kim | ............... | H04W 48/14 370/329 |

OTHER PUBLICATIONS

International Search Report for PCT Application No. PCT/JP2021/016689, mailed on Aug. 2, 2021.

3GPP TR 21.905: "Vocabulary for 3GPP Specifications" V15.0.0 (Mar. 2018), pp. 1-66.

3GPP TS 23.501: "System Architecture for the 5G System; Stage 2" V16.1.0 (Jun. 2019), pp. 1-367.

3GPP TS 23.502: "Procedures for the 5G System; Stage 2" V16.4.0 (Mar. 2020), pp. 1-582.

GSMA, "Generic Network Slice Template", Version 2.0, Oct. 16, 2019, pp. 1-61.

3GPP TR 23.700-40: "Study on enhancement of network slicing" V0.3.0 (Jan. 2020), pp. 1-62.

3GPP TS 23.032: "Universal Geographical Area Description (GAD)" V15.1.0 (Sep. 2018), pp. 1-32.

IETF RFC 5580: Tschofenig, et al., "Carrying Location Objects in RADIUS and Diameter", Aug. 2009, pp. 1-53.

S2-1908595, SA WG2, 3GPP Draft, Intel et al.,: "Clarification on NEF discovery by an AF", Jun. 24-28, 2019, pp. 1-4.

GSMA, "Generic Network Slice Template", Official Document NG.116, Version 3.0, May 22, 2020, pp. 1-64.

Japanese Office Action for JP Application No. 2021-575052 mailed on Nov. 22, 2022 with English Translation.

Tricci So, ZTETX Inc., "FS_eNS_Ph2 Status Report", 3GPP TSG SA WG2 Meeting #137e, S2-2001953, Feb. 18, 2020.

* cited by examiner

SUPPORT FOR NETWORK SLICE QUOTA EVENT NOTIFICATION

This application is a National Stage Entry of PCT/JP2021/016689 filed on Apr. 26, 2021, which claims priority from European Patent Application 20173721.0 filed on May 8, 2020, the contents of all of which are incorporated herein by reference, in their entirety.

TECHNICAL FIELD

The present disclosure relates to a communication system. The disclosure has particular but not exclusive relevance to wireless communication systems and devices thereof operating according to the 3rd Generation Partnership Project (3GPP) standards or equivalents or derivatives thereof. The disclosure has particular although not exclusive relevance to network slice quota management in the so-called '5G' (or 'Next Generation') systems.

Abbreviations

3GPP: 3rd Generation Partnership Project
5G: 5th Generation
5GC: 5G Core Network
5GS: 5G System
5G-AN: 5G Access Network
AF: Application Function
AMF: Access and Mobility Management Function
AS: Application Server
BSS: Business Support System
DL: Downlink
gNB: Next generation Node B
GPSI: Generic Public Subscription Identifier
GST: Generic Slice Template
GUTI: Global Unique Temporary Identifier
IMSI: International Mobile Subscriber Identifier
LCM: Life Cycle Management
MANO: Management and Orchestration
MNO: Mobile Network Operator
MSISDN: Mobile Station International Subscriber Directory Number
NAS: Non-Access Stratum
NEF: Network Expose Function
NF: Network Function
NG-RAN: Next Generation Radio Access Network
NR: New Radio
NSQ: Network Slice Quota function
NSSF: Network Slice Selection Function
NWDAF: Network Data Analytics Function
OAM: Operations and Maintenance
OSS: Operations Support System
PCC: Policy and Charging Control
PCF: Policy Control Function
PDU: Protocol Data Unit
PEI: Permanent Equipment Identifier
PLMN: Public land mobile network
RA: Registration Area
(R)AN: (Radio) Access Network
RRC: Radio Resource Control
SLA: Service Level Agreement
S-TMSI: Serving Temporary Mobile Subscriber Identity
SUPI: Subscription Permanent Identifier
TA: Tracking Area
UDM: Unified Data Management
UDR: Unified Data Repository
UL: Uplink
UE: User Equipment

Definitions

For the purposes of the present document, the terms and definitions given in 3GPP Technical Report (TR) 21.905 [NPL 1] and the following apply. A term defined in the present document takes precedence over the definition of the same term, if any, in 3GPP TR 21.905 [NPL 1].

BACKGROUND ART

Network slicing features defined in 3GPP release 15 and release 16 enable a great variety of communication services for operators and verticals alike. To enhance the commercial viability of Network Slicing, GSMA 5GJA has introduced in document NG.116 the concept of Generic Slice Template [NPL 4] from which several Network Slice Types descriptions can be derived. Some of the parameters in the GST point explicitly to the definition of parameters and bounds on the service delivered to the end customer. However, the enforcement of some of these bounds and these parameters are not supported by the 5GS yet.

The SA2 Study on Enhancement of Network Slicing Phase 2 [NPL 5] aims at identifying the gaps that need to be filled in providing support for the GST parameters enforcement and the suitable solution to address these gaps. 3GPP SA2 working group agreed a new 'key issue' on Support of network slice quota event notification in a network slice, see Key Issue 4 in TR 23.700-40 ver0.3.0 [NPL 5]. This key issue will study whether and how to support event notifications regarding Network Slice related quotas. This key issue covers Network Slice related quotas defined in all key issues described in this Technical Report, therefore, there will not be an independent solution to this key issue for each of the key issues addressed in this Technical Report.

In particular, this key issue will address:
Whether and how an AF can request event notifications from 5GS and be notified by 5GS on quotas on network slice related attributes, e.g., notifying the AF whether a quota for certain attribute has reached a specified threshold, thereby allowing the AF to influence 5GS routing decisions.
NOTE: As part of study to this key issue interactions with OAM, if any, will be determined.

CITATION LIST

Non Patent Literature

NPL 1: 3GPP TR 21.905: "Vocabulary for 3GPP Specifications". V15.0.0 (2018 March)
NPL 2: 3GPP TS 23.501: "System Architecture for the 5G System; Stage 2". V16.1.0 (2019 June)—http://www.3gpp.org/ftp/Specs/archive/23_series/23.501/23501-g40.zip
NPL 3: 3GPP TS 23.502: "Procedures for the 5G System; Stage 2" V16.140 (2019 June)—http://www.3gpp.org/ftp/Specs/archive/23_series/23.502/23502-g40.zip
NPL 4: Generic Network Slice Template https://www.gsma.com/newsroom/wp-content/uploads/NG.116-v2.0.pdf
NPL 5: SA2 SID on Enhancement of Network Slicing Phase 2.—http://www.3gpp.org/ftp/tsg_sa/WG2_Arch/Latest_SA2_Specs/Latest_draft_S2_S pecs/23700-40-030.zip
NPL 6: 3GPP TS 23.032: "Universal Geographical Area Description (GAD)" V15.1.0 (2018 September)—https://www.3gpp.org/ftp/Specs/archive/23_series/23.032/23032-f10.zip NPL 7: IETF RFC 5580: "Carrying Location Objects in RADIUS and Diameter".

SUMMARY OF INVENTION

Technical Problem

With the introduction of the LCM (Life Cycle Management) in the 3GPP mobile networks, 3GPP operator can add/delete network resources per network slice. The LCM allows the network operator to assign network resources to a customer based on the SLA (Service Level Agreement) with the customer (e.g. 3rd party service provider).

However, the 3rd party service provider currently is not able to monitor the usage of the assigned network resources over their network slices, e.g. the levels of SLA agreed quotas (i.e. number of UEs per network slice, number of PDU sessions per network slice and UL/DL data rate per network slice per UE) over the deployed network resources:

If the usage of the network resources is considerably low, then the SLA agreed quotas may not be utilized i.e. the 3rd party service provider may be running the business inefficiently (i.e. wasting money).

If the usage of the network resources is all time high, then the SLA agreed quotas may be insufficient, i.e. the 3rd party service operator may be failing service quality, i.e. bad user experience.

Clearly there is a need for the 3rd party service providers to be able to closely monitor the service quality and the usage level of the allocated network resources and quotas per network slice basis. This would enable the service provider to address any issue in time in order to maintain delivery of an optimal level of service quality and ensure quotas are as per the SLA.

Solution to Problem

In a first aspect, there is provided a network function node for Network Slice management and control, comprising:
- means for receiving a message for quota on a network slice, from another network function node or an application function node; and
- means for sending information indicating a value for the quota on the network slice, to the another network function node or the application function node.

In a second aspect, there is provided a network function node for Network Slice management and control, comprising:
- means for receiving a request message for updating quota on a network slice, from another network function node or an application function node;
- means for updating the quota on the network slice based on the request message; and
- means for sending a response message for confirming of the updating the quota on the network slice, to the another network function node or the application function node.

In a third aspect, there is provided an application function node for Network Slice management and control, comprising:
- means for sending a message for quota on a network slice, to a network function node for Network Slice management and control;
- means for receiving information indicating a value for the quota on the network slice, from the network function node for Network Slice management and control.

In a fourth aspect, there is provided an application function node for Network Slice management and control, comprising:
- means for sending a request message for updating quota on a network slice, to a network function node for Network Slice management and control; and
- means for receiving a response message for confirming of the updating the quota on the network slice, from the network function node for Network Slice management and control, upon updating the quota on the network slice based on the request message.

In a fifth aspect, there is provided a Network Exposure Function node comprising:
- means for receiving a message for subscribing or updating quota on a network slice, from a network function node or an application function node;
- means for authenticating whether the network function node or the application function node is authorized for subscription or update of the quota on the network slice;
- means for selecting a network function node for Network Slice management and control in a case where the means for authenticating determines that an authentication is successful; and
- means for forwarding the message to the network function node for Network Slice management and control.

In a sixth aspect, there is provided a method for Network Slice management and control, comprising:
- receiving a message for quota on a network slice, from another network function node or an application function node; and
- sending information indicating a value for the quota on the network slice, to the another network function node or the application function node.

In a seventh aspect, there is provided a method for Network Slice management and control, comprising:
- receiving a request message for updating quota on a network slice, from another network function node or an application function node;
- updating the quota on the network slice based on the request message; and
- sending a response message for confirming of the updating the quota on the network slice, to the another network function node or the application function node.

In an eighth aspect, there is provided a method for Network Slice management and control, comprising:
- sending a message for quota on a network slice, to a network function node for Network Slice management and control;
- receiving information indicating a value for the quota on the network slice, from the network function node for Network Slice management and control.

In a ninth aspect, there is provided a method for Network Slice management and control, comprising:
- sending a request message for updating quota on a network slice, to a network function node for Network Slice management and control; and
- receiving a response message for confirming of the updating the quota on the network slice, from the network function node for Network Slice management and control, upon updating the quota on the network slice based on the request message.

In a tenth aspect, there is provided a method for Network Exposure Function, comprising:
- receiving a message for subscribing or updating quota on a network slice, from a network function node or an application function node;

authenticating whether the network function node or the application function node is authorized for subscription or update of the quota on the network slice;

selecting a network function node for Network Slice management and control in a case where the means for authenticating determines that an authentication is successful; and forwarding the message to the network function node for Network Slice management and control.

Advantageous Effects of Invention

According to the present disclosure, it is possible to provide a method and an apparatus for estimating an appearance of a first target.

BRIEF DESCRIPTION OF DRAWINGS

Embodiments of the invention will be better understood and readily apparent to one of ordinary skill in the art from the following written description, by way of example only, and in conjunction with the drawings, in which.

DESCRIPTION OF EMBODIMENTS

Common Aspect

Architecture for dynamic network slice quota control with LCM (Life Cycle Management)

Figure 1:
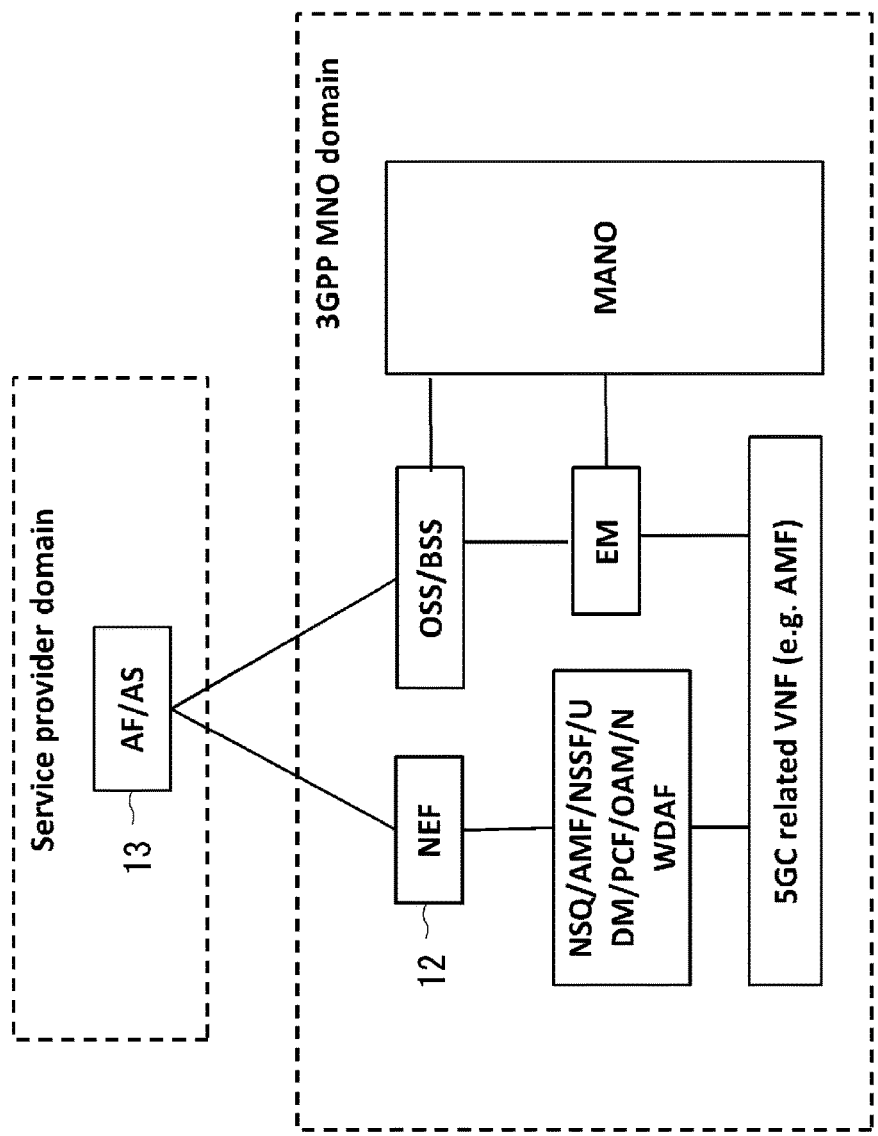
FIG. 1 illustrates schematically an exemplary architecture for dynamic network slice quota control.

FIG. 1 illustrates schematically an exemplary architecture for dynamic network slice quota control.

This architecture provides a dynamic Life Cycle Management based on network resource usage in each Mobile Network Operator's network based on Service Level Agreements (SLA). The dynamic network slice control is based on the following Architecture Principle:

The AF/AS 13 may reside in the 3GPP MNO domain if services over network slice are provided by an MNO. In this case, the NEF 12 may not be needed and the NSQ/AMF/NSSF/UDM/PCF/OAM/NWDAF entity would directly interface with the AF/AS 13.

The AF/AS 13 may interface with multiple 3GPP MNOs if the service over the network slice spans over multiple 3GPP MNO domains.

If a service over the network slice spans over multiple 3GPP MNO domains, the AF/AS 13 provides a coordinated quota assignment among multiple MNOs in order to guarantee end to end service over the slice regardless of where UE 3 roams to.

The AF/AS 13 assigns network slice quota based on the SLA managed in the AF/AS 13.

The AF/AS 13 assigns network slice quota to an MNO network based on the network resources reserved by the MNO domain:

If the network slice needs to a top-up the network slice quota, necessary network resources are guaranteed/provisioned by the OSS/BSS of the MNO domain in advance. The OSS/BSS may trigger the instantiation of additional network resources in coordination with their MANO system.

If the network slice needs to a cut-down the network slice quota, the OSS/BSS may take out some network resources via their MANO system and these network resources would be used for other purposes by the MNO.

Figure 2:
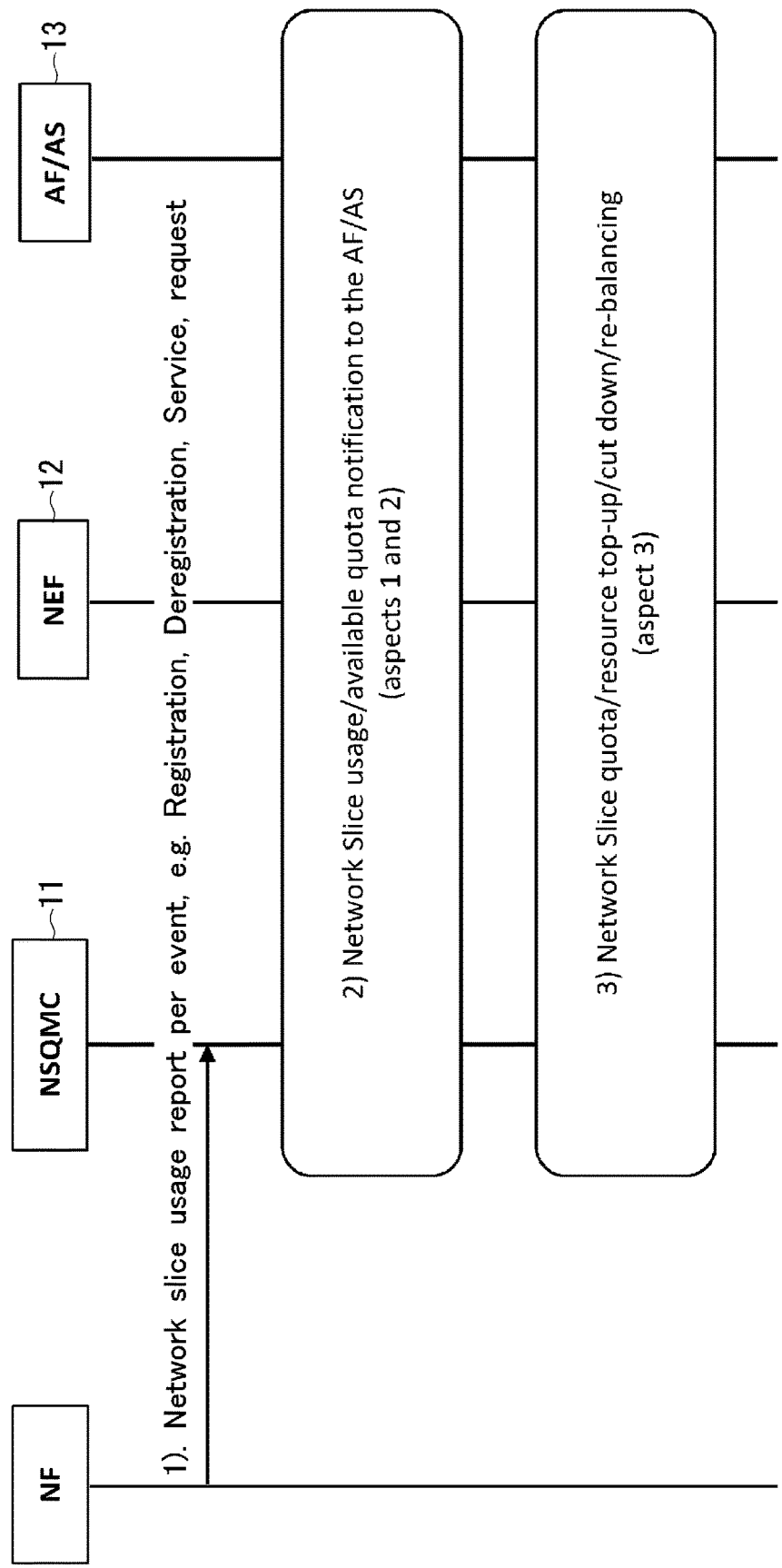
FIG. 2 is a high level demonstration for network slice quota notification and retrieval (aspects 1 and 2) and network slice quota updates (aspect 3).

FIG. 2 is a high level demonstration for network slice quota notification and retrieval (aspects 1 and 2) and network slice quota updates (aspect 3).

This exemplary procedure includes the following steps:

1) Network slice usage report per event—The network function or entity (NF) reports network slice quota usage to a network slice quota management and control node (called as NSQMC 11 throughout this document).

The NSQMC 11 can be an NSQ, an AMF, an NSSF, a UDM, a PCF, an OAM or an NWDAF.

The NSQMC 11 can be collocated with the NSQ, the AMF, the NSSF, the UDM, the PCF, the OAM or the NWDAF.

The NF can be an AMF, an SMF, a PCF, a Base Station 5 or UE 3.

Network slice quotas can be the number of UEs 3 per network slice quota or/and number of PDU Sessions per network slice quota or/and UL/DL data rate per network slice quota per UE 3.

The Network slice usage report per event can be executed, like with the AMF at registration and de-registration procedures and interacting with the SMF during PDU Session establishment/release procedures. This way the NSQMC 11 holds an up-todate information about the available network slice quotas.

The NSQMC 11 can exist as only one entity in PLMN representing the PLMN or can exist as multiple entities in the PLMN. If there are multiple NSQMC 11 exist in the PLMN, only one NSQMC 11 interacts with the NEF 12 and AF/AS 13 representing the PLMN. In this case, the NSQMC 11 representing the PLMN has to interwork with other NSQMCs 11 to maintain an up-to-date quota information that are valid for the PLMN.

2) Network slice usage/quota notification to the AF/AS 13—the AF/AS 13 monitors the up-todate status of the network slice quota in the mobile network. See aspect 1 and aspect 2.

3) Network Slice quota/resource reconfiguration (e.g. top-up/cut down/re-balancing)—Based on the network slice usage/quota notification to the AF/AS 13, the AF/AS 13 can react appropriately when the network slice quota usage is all time low (i.e. the quota is not used optimally and it may need to be cut-down or re-distributed/re-allocated) or the network slice quota usage is too high (i.e. shortage of quota meaning the service quality may be low and there may be a need for re-configuration of resources (e.g. top-up the quota). See aspect 3.

Aspect 1—Network Slice Quota Event Notification

Aspect 1, Example 1: AF/AS Subscription for Network Slice Quota Notification

Figure 3:
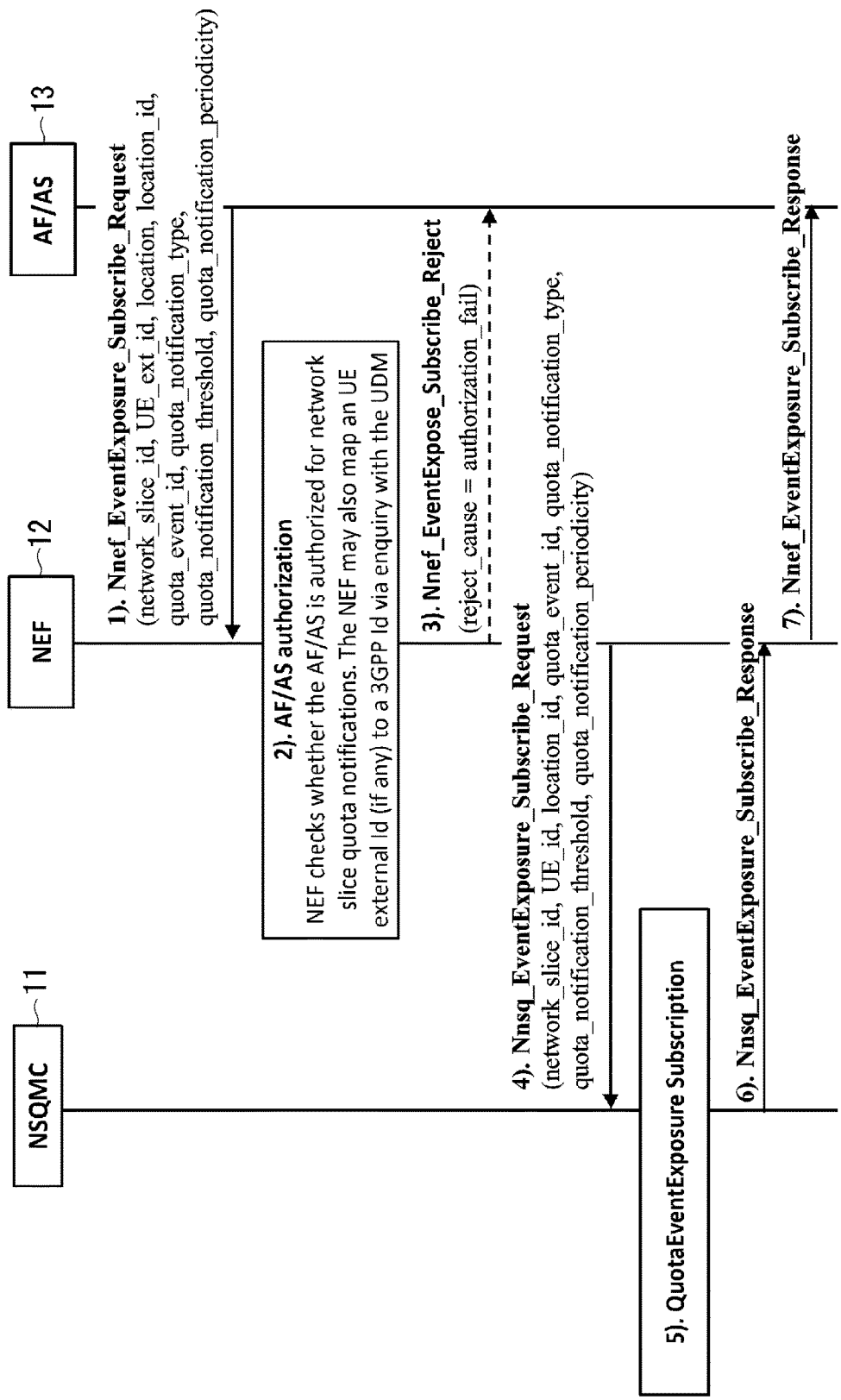
FIG. 3 illustrates an exemplary procedure for AF/AS subscription for network slice quota notification.

A Service Provider (AF/AS 13), which could be 3GPP external (i.e. not owned by the 3GPP network operator) or 3GPP internal (i.e. owned by the 3GPP network operator) application function or server may require to monitor the network slice quota status within the 3GPP mobile network. For this, the AF/AS 13 subscribes with the NSQMC 11. An exemplary procedure for AF/AS subscription for network slice quota notification is illustrated in FIG. 3.

1) Nnef_EventExposure_Subscribe_Request—The AF/AS 13 triggers a subscription for network slice quota notification event by sending Nnef_EventExposure_Subscribe_Request (network_slice_id, UE_ext_Id, location_id, quota_event_id, quota_notification_type, quota_notification_threshold, quota_notification_periodicity) message to the NEF 12. The AF/AS 13 includes the following parameters in the Nnef_EventExposure_Subscribe_Request message:

'network_slice_id': one or more network slices (S-NSSAIs) for which the AF/AS 13 requires network slice quota notification subscription;

'UE_ext_id': one or more UE external identities (e.g. GPSI, MSISDN) for which a network slice quota status notification subscription is required;

'location': geographical location for which the network slice quota notification are required. The location can form Ellipsoid point with uncertainty circle, Ellipsoid point with uncertainty ellipse, High Accuracy Ellipsoid point with uncertainty ellipse, Polygon, Ellipsoid Point with Altitude, Ellipsoid point with altitude and uncertainty ellipsoid, High Accuracy Ellipsoid point with altitude and uncertainty ellipsoid, Ellipsoid Arc as defined in 3GPP TS 23.032 [NPL 6]. The location can be operator name, Civic location, Geospatial Location as defined in IETF RFC 5580 [NPL 7]. This information may not be required when location_id' information is set in this message;

'location_id': geographical location (TA(s), RA(s) or cells) for which the network slice quota notification are required (this information may not be required when 'location' information is set in this message);

'quota_event_id': one or a list of quota event identities to be monitored, e.g. maximum number of UEs 3 per network slice quota and/or maximum number of PDU Sessions per network slice quota and/or maximum UL or DL data rate per network slice per UE quota;

'quota_notification_type': the type of the network slice quota notification, e.g.:
one-time notification; or
threshold based notification, e.g. the network slice quota notification is triggered when a certain level (in numbers or percentage) of the quota is reached or is remaining;
or periodical notification, e.g. the network slice quota notification is triggered at expiry of a defined periodic timer;

'quota_notification_threshold': an optional parameter. If the 'quota_notification_type' is threshold based, the AF/AS 13 includes the 'quota_notification_threshold' itself as well. The 'quota_notification_threshold' can be a value (e.g. the quota is a value in numbers, at reaching of which the network slice quota notification is triggered or the network slice quota is a percentage value of the remaining network slice quota or of the already used network slice quota);

'quota_notification_periodicity': An optional parameter. If the 'quota_notification_type' is periodical, the AF/AS 13 includes the 'quota_notification_periodicity' parameter as well. The 'quota_notification_periodicity' parameter can be a time value defining the time between consequent periodical network slice quota notifications to the AF/AS 13.

If the AF/AS 13 knows NSQMC node name(s) or address(es) in advance, the AF/AS 13 includes NSQMC node name(s) or address(es) in the Nnef_EventExposure_Subscribe_Request message.

2) AF/AS authorization—The NEF 12 checks whether the AF/AS 13 is authorized for network slice quota notifications subscription. If AF/AS authorization is successful, continue to step 4. An address of NSQMC(s) 11 may be resolved by the NEF 12 at this point.

3) If the AF/AS authorization fails, the NEF returns Nnef_EventExpose_Subscribe_Reject (reject_cause=authorization_fail) message in which the NEF includes a reject cause reject_cause=authorization_fail and the procedure ends here.

4) Nnsq_EventExposure_Subscribe_Request—The NEF 12 may inquire with the UDM to translate UE external identities 'UE_ext_id' (e.g. GPSI, MSISDN) to a 3GPP internal 'UE_Id' (e.g. SUPI, PEI, IMSI, S-TMSI, GUTI). Then the NEF 12 forwards the subscription request from the AF/AS 13 to the NSQMC 11—Nnsq_EventExposure_Subscribe_Request (network_slice_id, UE_Id, location_id, quota_event_id, quota_notification_type, quota_notification_threshold, quota_notification periodicity). In case the NEF 12 receives the location from the AF/AS 13 in the Nnef_EventExposure_Subscribe_Request message, the NEF 12 converts the location to a location id.

If multiple NSQMCs 11 exists in the PLMN, the NEF 12 may choose one or multiple NSQMC(s) 11 and sends one or multiple Nnsq_EventExposure_Subscribe_Request message(s) to the NSQMC(s) 11. For example, if the Nnef_EventExposure_Subscribe_Request message includes specific 'location_id', the NEF 12 sends Nnsq_Event Exposure_Subscribe_Request message(s) only to NSQMC(s) 11 that are involved to such location.

5) QuotaEventExposure Subscription—The NSQMC 11 subscribes the AF/AS 13 for network slice quota status notification event in compliance with the requested event notification parameters.

6) Nnsq_EventExposure_Subscribe_Response—The NSQMC 11 confirms the AF/AS subscription for network slice quota notification to the NEF 12.

7) Nnef_EventExposure_Subscribe_Response—The NEF 12 may inquire with the UDM to translate 3GPP internal 'UE_Id' (e.g. SUPI, PEI, IMSI, S-TMSI, GUTI) to 'UE_ext_id' (e.g. GPSI, MSISDN) and then the NEF 12 forwards the network slice quota notification subscription confirmation to the AF/AS 13. The NEF 12 also includes NSQMC names(s) or address(es) in this message.

Aspect 1, Example 2: Network Slice Quota Notification

Figure 4:
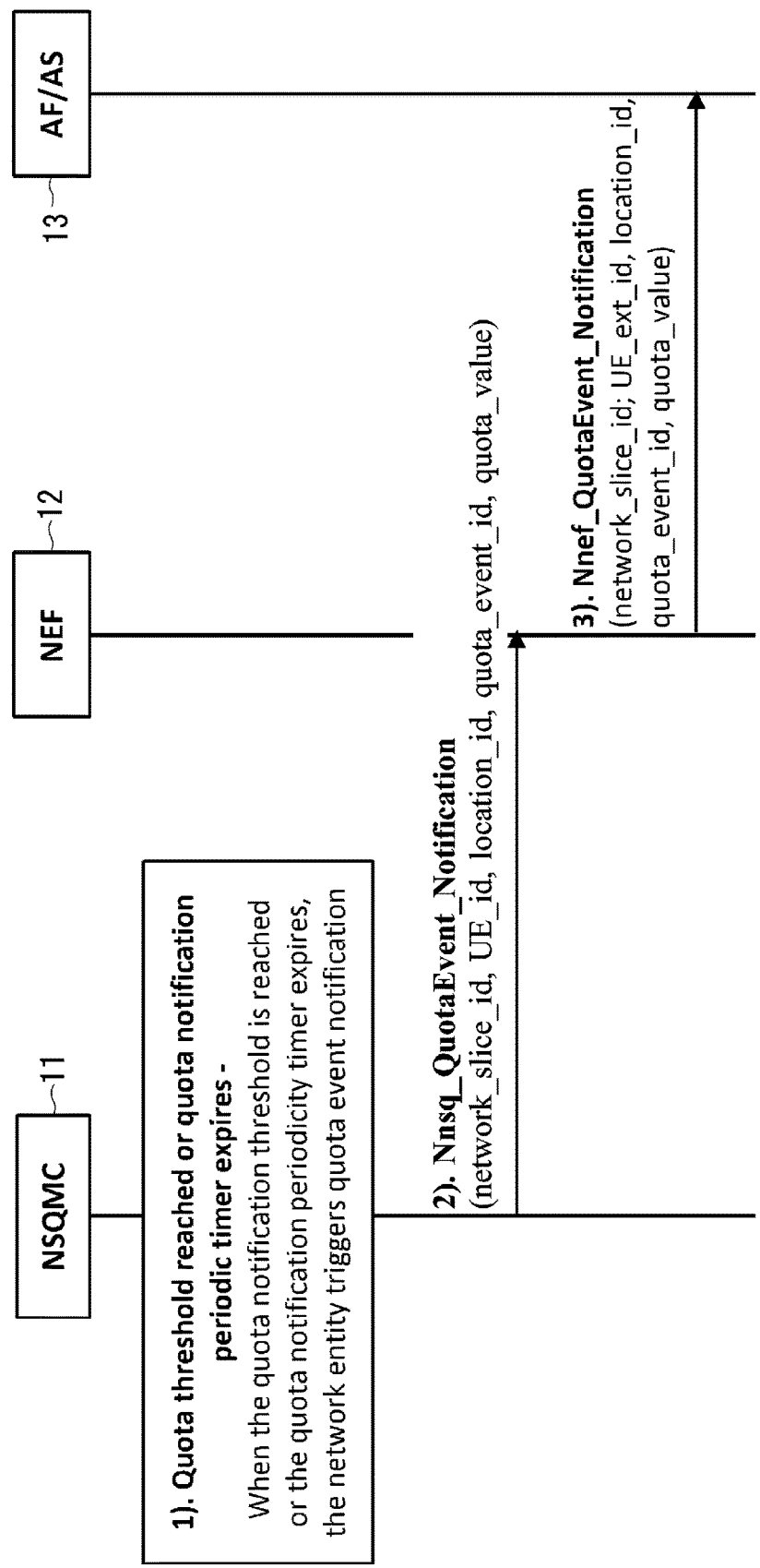
FIG. 4 illustrates an exemplary procedure for Network Slice Quota Notification.

When the quota notification threshold is reached or the quota notification periodicity timer expires, the NSQMC 11 triggers the quota event notification, as illustrated schematically in FIG. 4.

1) Quota threshold reached or quota notification periodic timer expires—When the network slice quota notification threshold is reached or the network slice quota notification periodic timer expires, the NSQMC 11 triggers the network slice quota event notification procedure.

2) Nnsq_QuotaEvent_Notification—The NSQMC 11 sends Nnsq_QuotaEvent_Notification (network_slice_id; UE_Id, location_id, quota_event_id, quota_value) to the NEF 12 with the following parameters:

'network_slice_id': one or more network slices (S-NS-SAIs) for which the network slice quota notification is applicable;

'UE_id': one or more UE identities (e.g. SUPI, PEI, IMSI, GUTI or S-TMSI) for which the network slice quota notification is related to.

'location_id': geographical location (TA(s), RA(s) or list of cells) for which the network slice quota notification is applicable.

'quota_event_id': one or a list of quota event identities, e.g. max number of UEs 3 per network slice quota and/or max number of PDU Sessions per network slice quota and/or max UL or DL data rate per network slice per UE quota;

'quota_value': the 'quota_value' represents the up-to-date status of the network slice quota. It could be a numeric value (e.g. the current number of UEs 3 per network slice, the current number of PDUs Sessions per network slice, the current value of the UL/DL data per network slice per UE 3) or the 'quota_value' may represent in percentage the used level of the network slice quota or the remaining/available level of the network slice quota per one or more types of 'quota_event_id'.

3) The NEF 12 may inquire with the UDM in order to map the 3GPP internal 'UE_Id' (e.g. SUPI, PEI, IMSI, S-TMSI, or GUTI) to 'UE_ext_Id' (e.g. GPSI, MSISDN). Then the NEF 12 forwards the received network slice quota notification to the AF/AS 13. In case the NEF 12 receives the location information from the AF/AS 13 in the Nnef_EventExposure_Subscribe_Request message, the NEF 12 converts the location id to a location and sent it to the AF/AS 13.

Aspect 2—Network Slice Quota Retrieval

Figure 5:
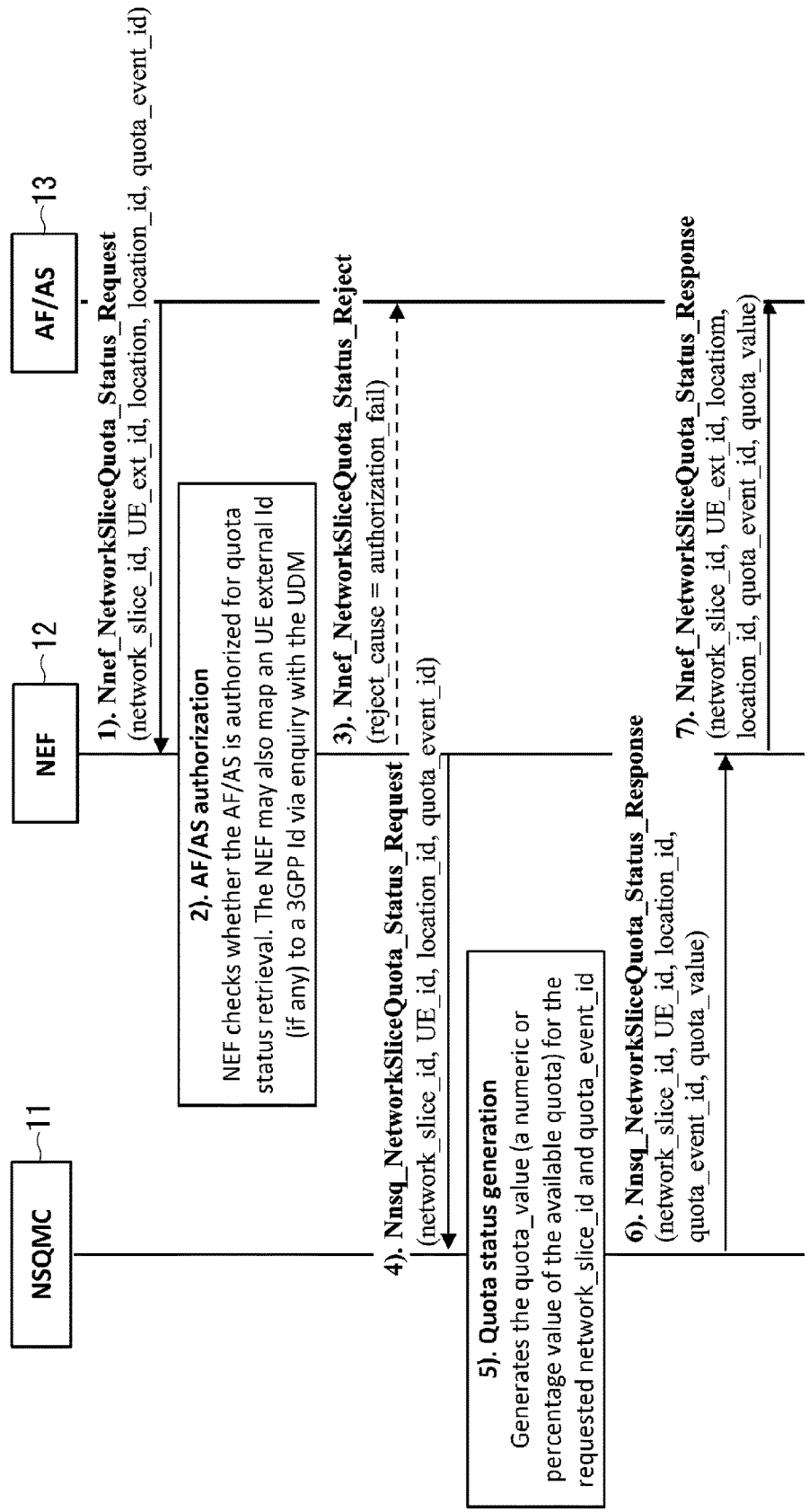
FIG. 5 illustrates the AF/AS 13 may request network slice current quota from the NSQMC 11.

Service provider or 3GPP owned application/server (AF/AS 13) may require to retrieve the current network slice quota from the 3GPP system. The AF/AS 13 may request network slice current quota from the NSQMC 11, as illustrated schematically in FIG. 5.

1) Nnef_NetworkSliceQuota_Status_Request (network_slice_id, UE_ext_id, location_id, quota_event_id)—The AF/AS 13 sends a request for network slice quota retrieval to the NEF 12 and includes some or all of the following parameters:

'network_slice_id': one or more network slices (S-NS-SAIs) for which the up-todata network slice quota status to be retrieved;

'UE_ext_id': one or more UE external identities (e.g. GPSI, MSISDN) for which the up-to-data network slice quota status to be retrieved;

'location': geographical location for which the network slice quota notification are required. The location can form Ellipsoid point with uncertainty circle, Ellipsoid point with uncertainty ellipse, High Accuracy Ellipsoid point with uncertainty ellipse, Polygon, Ellipsoid Point with Altitude, Ellipsoid point with altitude and uncertainty ellipsoid, High Accuracy Ellipsoid point with altitude and uncertainty ellipsoid, Ellipsoid Arc as defined in 3GPP TS 23.032 [NPL 6]. The location can be operator name, Civic location, Geospatial Location as defined in IETF RFC 5580 [NPL 7]. This information may not be required when 'location_id' information is set in this message;

'location_id': geographical location (TA(s), RA(s) or list of cells) for which the upto-data network slice quota status to be retrieved. This information may not be required when 'location' information is set in this message;

'quota_event_id': one or a list of network slice quota identities e.g. max number of UEs 3 per network slice quota and/or max number of PDU Sessions per network slice quota and/or max UL or DL data rate per network slice per UE quota) for which the up-to-data network slice quota status to be retrieved.

If the AF/AS 13 knows NSQMC node name(s) or address(es) in advance, the AF/AS 13 includes NSQMC node name(s) or address(es) in the Nnef_EventExposure_Subscribe_Request message.

2) AF/AS authorization—The NEF 12 checks whether the AF/AS 13 is authorized for quota status retrieval. The NEF 12 may also map an 'UE_ext_id' (e.g. GPSI, MSISDN) to a 3GPP internal 'UE_Id' (e.g. SUPI, PEI, IMSI, GUTI or S-TMSI) via enquiry with the UDM.

If AF/AS authorization is successful, continue to step 4.

3) If the AF/AS authorization fails, the NEF 12 returns Nnef_NetworkSliceQuota_Status_Reject (reject_cause=authorization_fail) message in which the NEF 12 includes a reject cause reject_cause=authorization_fail and the procedure ends here.

4) Nnsq_NetworkSliceQuota_Status_Request (network_slice_id, UE_id, location_id, quota_event_id)—The NEF 12 forwards the request from the AF/AS 13 for network slice quota status retrieval to the NSQMC 11 or the entity that holds the latest status of the network slice quota (e.g. NSQ/AMF/NSSF/UDM/PCF/OAM/NWDAF). In case the NEF 12 receives the location from the AF/AS 13 in the Nnef_NetworkSliceQuota_Status_Request message, the NEF 12 converts the location to a location id.

5) Quota status generation—The NSQMC 11 or the entity that holds the latest status of the network slice quota (e.g. NSQ/AMF/NSSF/UDM/PCF/OAM/NWDAF) generates the 'quota_value' (a numeric or percentage value of the available quota) for the requested 'network_slice_id' and 'quota_event_id' and in consideration of the 'UE_Id' and location_id', if any. The network slice 'quota_value' could be a numeric value (e.g. the current number of UEs per network slice, the current number of PDUs per network slice, the current value of the UL/DL data per network slice per UE 3) or the 'quota_value' may represent in percentage the used level of the network slice quota or the remaining/available level of the network slice quota per one or more types of 'quota_event_id'

6) Nnsq_NetworkSliceQuota_Status_Response (network_slice_id, UE_id, location_id, quota_event_id, quota_value)—The NSQMC 11 sends the network slice quota status information to the NEF 12 and includes some or all of the following parameters:

'network_slice_id': one or more network slices (S-NS-SAIs) for which the up-todata network slice quota status is reported;

'UE_id': one or more UE identities (e.g. SUPI, PEI, IMSI, GUTI or S-TMSI) for which the up-to-data network slice quota status is reported;

'location id': geographical location (TA(s), RA(s) or list of cells) for which the upto-data network slice quota status is reported.

'quota_event_id': one or a list of quota events identities e.g. max number of UEs 3 per network slice quota and/or max number of PDU Sessions per network slice quota and/or max UL or DL data rate per network slice per UE quota) for which the up-to-data network slice quota is reported.

'quota_value': numeric or percentage value of the reported quota. The 'quota_value' represents the up-to-date status of the network slice quota. It could be a numeric value (e.g. the current numbers of UEs 3 per network slice, the current numbers of PDUs per network slice, the current value of the UL/DL data per network slice per UE 3) or the 'quota_value' may represent in percentage the used level of the network slice quota or the remaining/available level of the network slice quota per one or more types of 'quota_event_id'.

7) Nnef_NetworkSliceQuota_Status_Response (network_slice_id, UE_ext_id, location_id, quota_event_id, quota_value)—The NEF 12 may map the UE internal 3GPP identity 'UE_id' (e.g. SUPI, PEI, IMSI, GUTI or S-TMSI) to UE external identity 'UE_ext_Id' (e.g. GPSI, MSISDN) via enquiry with the UDM. Then the NEF 12 forwards the response for network slice quota to the AF/AS 13. In case the NEF 12 receives the location information from the AF/AS 13 in the Nnef_NetworkSliceQuota_Status_Request message, the NEF 12 converts the location id to a location and sent it to the AF/AS 13.

Aspect 3—Network Slice Quota Provision and Top-Up/Cut-Down

The Service Provider or 3GPP owned application function/server (AF/AS 13) may require to provision or top-up or cut-down or replace the network slice quota in the mobile operator's network. The AF/AS 13 may request network slice quota update to the NSQMC 11 or the entity that holding the network slice quota (e.g. NSQ/AMF/NSSF/UDM/PCS/OAM/NWDAF) via the NEF 12, see FIG. 6.

This procedure may take place after appropriate LCM procedure has been completed with OSS/BSS and MANO of the PLMN.

Figure 6:
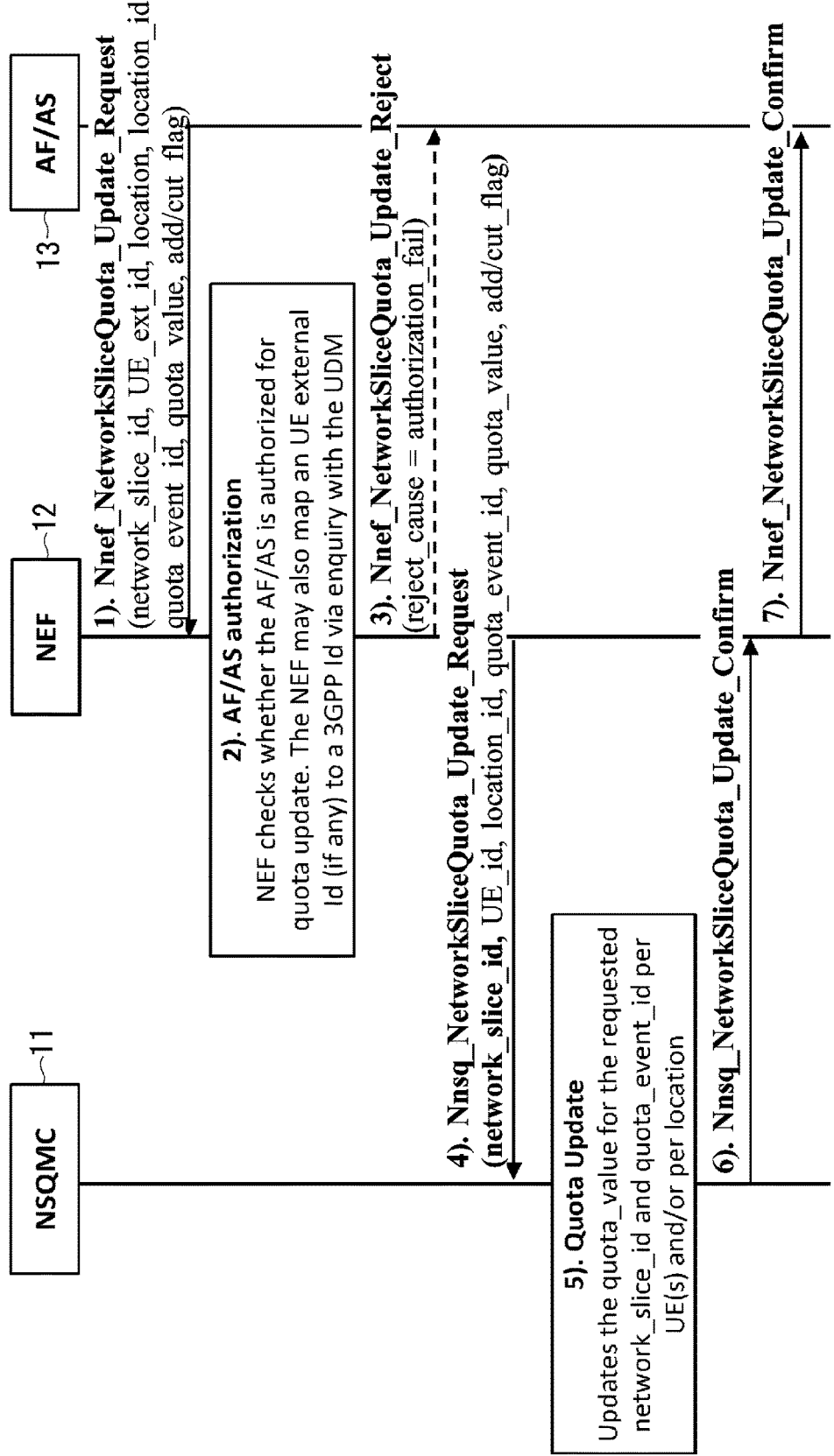
FIG. 6 illustrates schematically an exemplary procedure for Network Slice Quota provision or top-up/cut-down.

The procedure demonstrated in FIG. 6 may be used by the Service Operator for:

1) Initial provision in the mobile operators network the SLA agreed network slice quotas, e.g. the max numbers of UEs 3 per network slice quota, the max numbers of PDU Sessions per network slice quota, the max value of the UL/DL data rate per network slice per UE quota;

2) Top-up or cut-down the network slice quotas in the mobile operator's network based on re-negotiated SLA agreement with the mobile operator in order to optimise resource usage and/or balance the traffic load so that the service quality is maintained and resources are utilised in optimal way.

3) The Service operator may also re-balance the network slice quotas between multiple network slices (if the service is provided on multiple network slices) or between multiple mobile networks (if the service spans over multiple mobile networks).

FIG. 6 illustrates schematically an exemplary procedure for Network Slice Quota provision or top-up/cut-down.

1) Nnef_NetworkSliceQuota_Update_Request (network_slice_id, UE_ext_id, location_id, quota_event_id, quota_value, add/cut_flag)—AF/AS 13 sends a request for network slice quota update to the NEF 12 and includes some or all of the following parameters:

'network slice id': one or more network slices (S-NSSAIs) for which the network slice quota is to be updated;

'UE_ext_id': one or more UE external identities (e.g. GPSI, MSISDN) for which the network slice quota is to be updated;

'location': geographical location for which the network slice quota notification are required. The location can form Ellipsoid point with uncertainty circle, Ellipsoid point with uncertainty ellipse, High Accuracy Ellipsoid point with uncertainty ellipse, Polygon, Ellipsoid Point with Altitude, Ellipsoid point with altitude and uncertainty ellipsoid, High Accuracy Ellipsoid point with altitude and uncertainty ellipsoid, Ellipsoid Arc as defined in 3GPP TS 23.032 [NPL 6]. The location can be operator name, Civic location, Geospatial Location as defined in IETF RFC 5580 [NPL 7]. This information may not be required when 'location_id' information is set in this message;

'location id': geographical location (TA(s), RA(s) or list of cells) for which the network slice quota is to be updated. This information may not be required when 'location' information is set in this message;

'quota_event_id': one or a list of network slice quota event identities e.g. max number of UEs 3 per network slice quota and/or max number of PDU Sessions per network slice quota and/or max UL or DL data rate per network slice per UE quota) for which the network slice quota is to be updated;

'quota_value': numeric or percentage value of the network slice quota update. The 'quota_value' represents the network slice quota to be added or to be cut or to be replaced with. It could be a numeric value (e.g. the number of UEs 3 per network slice, the number of PDUs Sessions per network slice, the value of the UL/DL data rate per network slice per UE 3);

'add/cut_flag': this parameter may have multiple values in order to define whether the network slice quota update in 'quota_value' parameter is to:

be added (top-up) to the already allocated network slice quota in the 3GPP system;

be removed (cut-down) from the already allocated network slice quota in the 3GPP system; or replace completely the already allocated network slice quota in the 3GPP system (e.g. after re-negotiated SLA agreements with the mobile network operator).

If the AF/AS 13 knows NSQMC node name(s) or address(es) in advance, the AF/AS 13 includes NSQMC node name(s) or address(es) in the Nnef_NetworkSliceQuota_Update_Req message.

2) AF/AS authorization—The NEF 12 checks whether the AF/AS 13 is authorized for quota update.

If AF/AS authorization is successful, continue to step 4.

3) If the AF/AS authorisation fails, the NEF 12 returns Nnef_NetworkSliceQuota_Update_Reject (reject_cause=authorization_fail) message in which the NEF 12 includes a reject cause reject_cause=authorization_fail and the procedure ends here.

4) Nnsq_NetworkSliceQuota_Update_Request (network_slice_id, UE_id, location_id, quota_event_id, quota_value, add/cut_flag)—The NEF 12 may map an UE external identity 'UE_ext_id' (e.g. GPSI, MSISDN) to a 3GPP UE Identity 'UE_id' (e.g. SUPI, PEI, IMSI, GUTI or S-TMSI) via enquiry with the UDM. Then the NEF 12 forwards the request from the AF/AS 13 for network slice quota update to the network entity responsible for the network slice quota management or the entity that holds network slice quota (e.g. NSQ/AMF/NSSF/UDM/PCF/OAM/NWDAF). In case the NEF 12 receives the location from the AF/AS 13 in the Nnef_NetworkSliceQuota_Update_Request message, the NEF 12 converts the location to a location id.

5) Quota Update—The NSQMC 11 updates the 'quota_value' for the requested 'network_slice_id' and 'quota_event_id' per UE(s) 3 and/or per location.

6) Nnsq_NeworkSliceQuota_Update_Confirm—The NSQMC 11 confirms the network slice quota update to the NEF 12.

7) Nnef_NetworkSliceQuota_Update_Confirm—The NEF 12 may map the UE internal 3GPP identity 'UE_id' (e.g. SUPI, PEI, IMSI, GUTI or S-TMSI) to the UE external identity 'UE_ext_Id' (e.g. GPSI, MSISDN) via enquiry with the UDM. Then the NEF 12 forwards the confirmation for network slice quota update to the AF/AS 13.

SUMMARY

Beneficially, the above described aspects include, although they are not limited to, one or more of the following functionalities:

AF/AS (Application Function/Server) subscription with the network slice quota holding or managing entity (e.g. NSQ/AMF/NSSF/UDM/PCF/OAM/NWDAF) for slice quota related notifications—new subscription procedure (i.e. service) and parameters like network_slice_id, quota_event_id, quota_notification_type, quota_notification_threshold, quota_notification_periodicity.

Network slice quota notifications by the quota holding or managing entity (e.g. NSQ/AMF/NSSF/UDM/PCF/OAM/NWDAF)—new notification procedure (i.e. service) and parameters like network_slice_id; quota_event_id, quota_value.

Network slice quota retrieval by the AF/AS 13 from the quota holding or managing entity (e.g. NSQ/AMF/NSSF/UDM/PCF/OAM/NWDAF)—new quota retrieval procedure (i.e. service) and parameters like network_slice_id, quota_event_id, quota_value, UE_ext_id, location_id.

Network slice quota provision or top-up by the AF/AS 13—new quota update procedure and parameters like 'network_slice_id', 'quota_event_id', 'quota_value', 'UE_ext_id'.

New network slice quota notifications and quota status updates made available to the AF so that the AF can:
  re-balance the load on network slices by steering some UEs 3 between network slices;
  re-balancing (i.e. re-distribute) the local quota between the roaming partners in roaming;
  top-up or cut-down the quota per network slice to optimize the load and maintain the service quality (e.g. good user experience);
  add/remove network resources to maintain the expected network slice load and service quality within the SLA quota agreements.
  optimize the traffic load of the network slice by scheduling the traffic by time and location.
  re-negotiate new SLA quotas with the network operator.

Benefits

The above described aspects allow for a Service Provider to subscribe for network slice quota notifications and retrieval so that the Service Provider can monitor the up-to date status of the network slice quota in the mobile operator's network. The aspects also provide tools for network slice quota provisioning to 3GPP mobile networks, network slice quota updates and network slice quota re-balancing between network slices and between mobile networks.

System Overview

Figure 7:
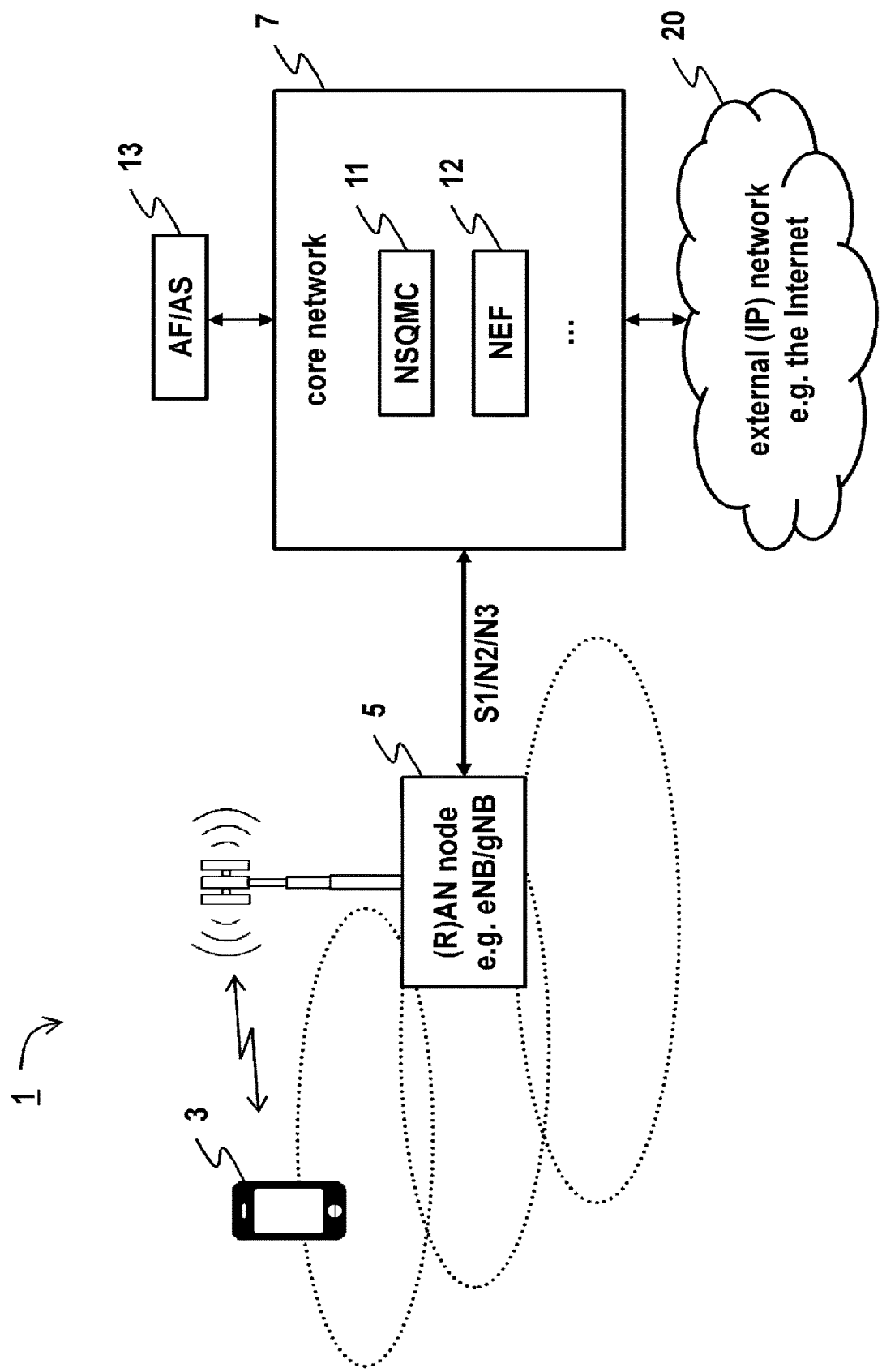
FIG. 7 schematically illustrates a mobile (cellular or wireless) telecommunication system 1 to which the above aspects are applicable.

FIG. 7 schematically illustrates a mobile (cellular or wireless) telecommunication system 1 to which the above aspects are applicable.

In this network, users of mobile devices 3 (UEs) can communicate with each other and other users via respective base stations 5 and a core network 7 using an appropriate 3GPP radio access technology (RAT), for example, an E-UTRA and/or 5G RAT. It will be appreciated that a number of base stations 5 form a (radio) access network or (R)AN. As those skilled in the art will appreciate, whilst one mobile device 3 and one base station 5 ((R)AN node) are shown in FIG. 7 for illustration purposes, the system, when implemented, will typically include other base stations and mobile devices 3 (UEs).

Each base station 5 controls one or more associated cells (either directly or via other nodes such as home base stations, relays, remote radio heads, distributed units, and/or the like). A base station 5 that supports E-UTRA/4G protocols may be referred to as an 'eNB' and a base station 5 that supports Next Generation/5G protocols may be referred to as a 'gNBs'. It will be appreciated that some base stations 5 may be configured to support both 4G and 5G, and/or any other 3GPP or non-3GPP communication protocols.

The mobile device 3 and its serving base station 5 are connected via an appropriate air interface (for example the so-called 'Uu' interface and/or the like). Neighbouring base stations 5 are connected to each other via an appropriate base station to base station interface (such as the so-called 'X2' interface, 'Xn' interface and/or the like). The base station 5 is also connected to the core network nodes via an appropriate interface (such as the so-called 'S1', 'N2', 'N3' interface, and/or the like).

The core network 7 typically includes logical nodes (or 'functions') for supporting communication in the telecommunication system 1. Typically, for example, the core network 7 of a 'Next Generation'/5G system will include, amongst other functions, control plane functions (CPFs) and user plane functions (UPFs). It will be appreciated that the core network 7 may also include, amongst others: a network slice quota management and control node (NSQMC) 11 and a network exposure function (NEF) 12. It will be appreciated that the functionalities of the NSQMC 11 may be provided by one or more of an NSQ, an AMF, an NSSF, a UDM, a PCF, an OAM, and an NWDAF. The core network 7 is also coupled to at least one application function (AF)/application server (AS) 13. From the core network 7, connection to an external IP network/data network 20 (such as the Internet) is also provided.

The components of this system 1 are configured to perform one or more of the above described aspects.

<User Equipment (UE)>

Figure 8:
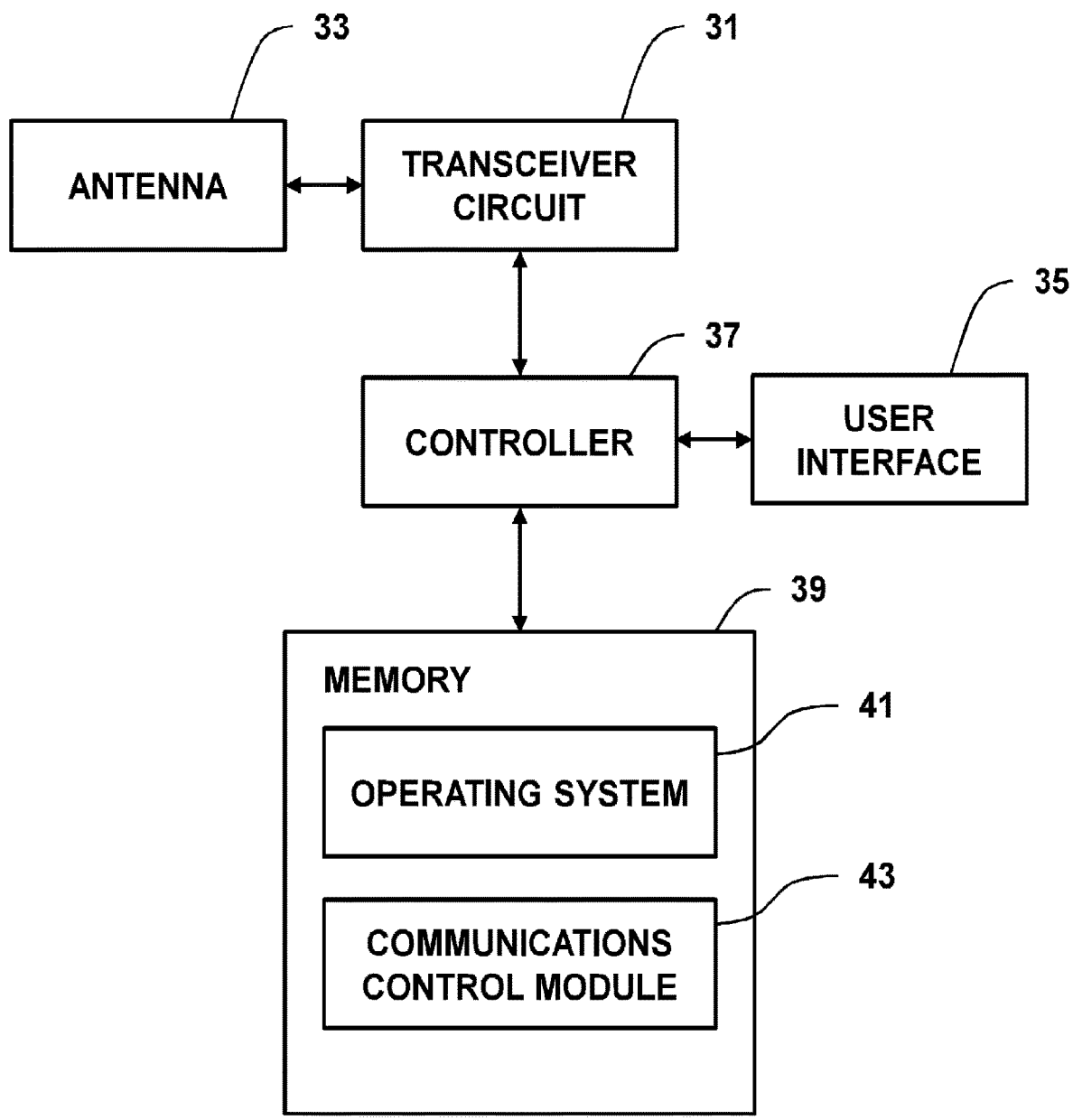
FIG. 8 is a block diagram illustrating the main components of the UE (mobile device 3) shown in FIG. 7.

FIG. 8 is a block diagram illustrating the main components of the UE (mobile device 3) shown in FIG. 7. As shown, the UE 3 includes a transceiver circuit 31 which is operable to transmit signals to and to receive signals from the connected node(s) via one or more antenna 33. Although not necessarily shown in FIG. 8, the UE 3 will of course have all the usual functionality of a conventional mobile device (such as a user interface 35) and this may be provided by any one or any combination of hardware, software and firmware, as appropriate. A controller 37 controls the operation of the UE 3 in accordance with software stored in a memory 39. The software may be pre-installed in the memory 39 and/or may be downloaded via the telecommunication network 1 or from a removable data storage device (RMD), for example. The software includes, among other things, an operating system 41 and a communications control module 43. The communications control module 43 is responsible for handling (generating/sending/receiving) signalling messages and uplink/downlink data packets between the UE 3 and other nodes, including (R)AN nodes 5, application functions, and core network nodes. Such signaling includes appropriately formatted requests and responses relating to network slice quota management.

<(R)an Node>

Figure 9:
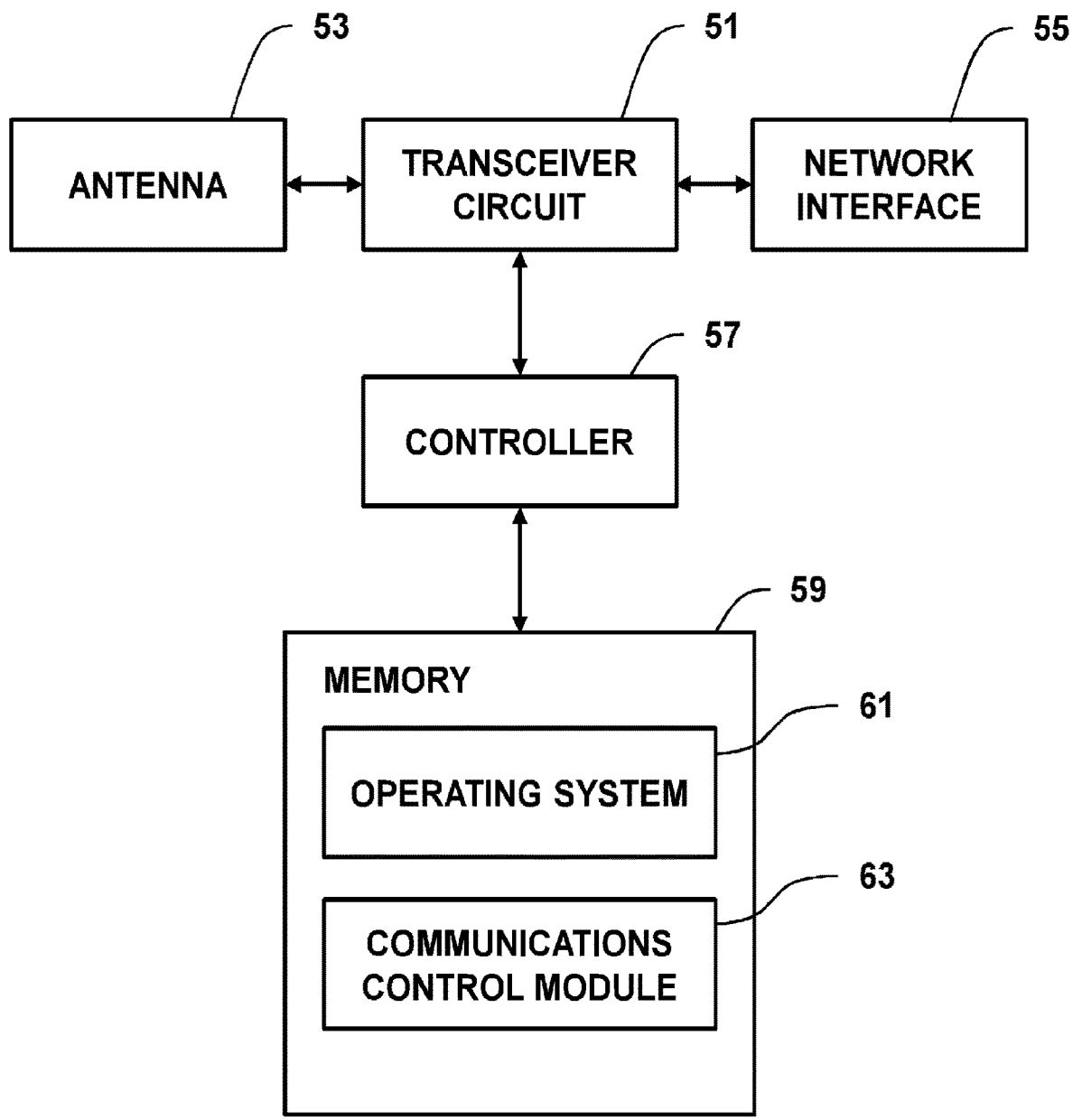
FIG. 9 is a block diagram illustrating the main components of an exemplary (R)AN node 5 (base station) shown in FIG. 7.

FIG. 9 is a block diagram illustrating the main components of an exemplary (R)AN node 5 (base station) shown in FIG. 7. As shown, the (R)AN node 5 includes a transceiver circuit 51 which is operable to transmit signals to and to receive signals from connected UE(s) 3 via one or more antenna 53 and to transmit signals to and to receive signals from other network nodes (either directly or indirectly) via a network interface 55. The network interface 55 typically includes an appropriate base station—base station interface (such as X2/Xn) and an appropriate base station—core network interface (such as S1/N2/N3). A controller 57 controls the operation of the (R)AN node 5 in accordance with software stored in a memory 59. The software may be pre-installed in the memory 59 and/or may be downloaded via the telecommunication network 1 or from a removable data storage device (RMD), for example. The software includes, among other things, an operating system 61 and a communications control module 63. The communications control module 63 is responsible for handling (generating/sending/receiving) signalling between the (R)AN node 5 and other nodes, such as the UE 3, the AF/AS 13, and the core network nodes. Such signaling includes appropriately formatted requests and responses relating to network slice quota management.

<Core Network Node>

Figure 10:
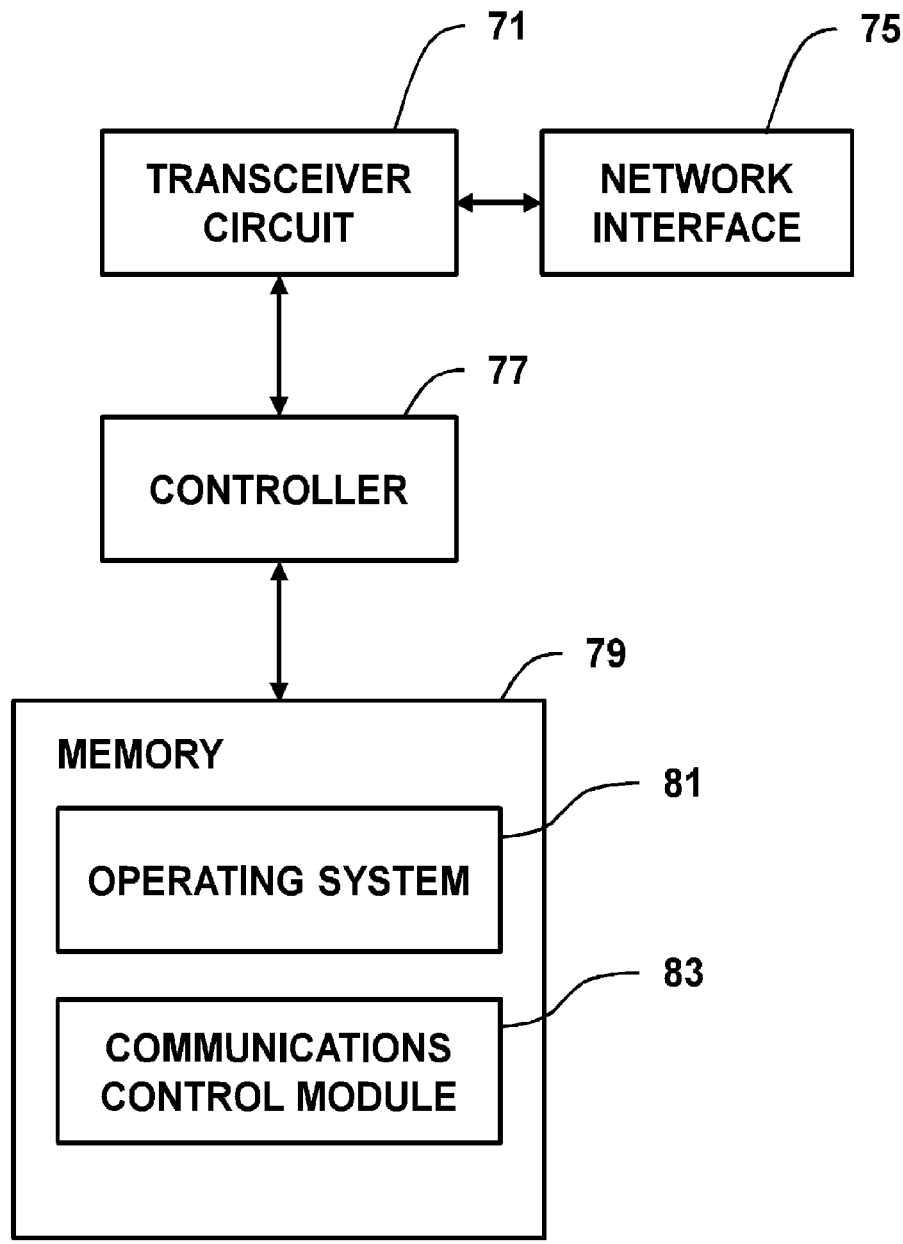
FIG. 10 is a block diagram illustrating the main components of a generic core network node (or function) shown in FIG. 7.

FIG. 10 is a block diagram illustrating the main components of a generic core network node (or function) shown in FIG. 7, for example, the NSQMC 11 (NSQ, AMF, NSSF, UDM, PCF, OAM, NWDAF, etc.) and the NEF 12. It will be appreciated that the same block diagram may be applicable to the AF/AS 13. As shown, the core network node includes a transceiver circuit 71 which is operable to transmit signals to and to receive signals from other nodes (including the UE 3 and the (R)AN node 5) via a network interface 75. A controller 77 controls the operation of the core network node in accordance with software stored in a memory 79. The software may be pre-installed in the memory 79 and/or may be downloaded via the telecommunication network 1 or from a removable data storage device (RMD), for example. The software includes, among other things, an operating system 81 and at least a communications control module 83. The communications control module 83 is responsible for handling (generating/sending/receiving) signaling between the core network node and other nodes, such as the UE 3, (R)AN node 5, and other core network nodes. Such signaling includes appropriately formatted requests and responses relating to network slice quota management.

Modifications and Alternatives

Detailed aspects have been described above. As those skilled in the art will appreciate, a number of modifications and alternatives can be made to the above aspects whilst still benefiting from the inventions embodied therein. By way of illustration only a number of these alternatives and modifications will now be described.

In the above description, the UE 3, the (R)AN 5 node, and the core network node are described for ease of understanding as having a number of discrete modules (such as the communication control modules). Whilst these modules may be provided in this way for certain applications, for example where an existing system has been modified to implement the above aspects, in other applications, for example in systems designed with the inventive features in mind from the outset, these modules may be built into the overall operating system or code and so these modules may not be discernible as discrete entities. These modules may also be implemented in software, hardware, firmware or a mix of these.

Each controller may comprise any suitable form of processing circuitry including (but not limited to), for example: one or more hardware implemented computer processors; microprocessors; central processing units (CPUs); arithmetic logic units (ALUs); input/output (TO) circuits; internal memories/caches (program and/or data); processing registers; communication buses (e.g. control, data and/or address buses); direct memory access (DMA) functions; hardware or software implemented counters, pointers and/or timers; and/or the like.

In the above aspects, a number of software modules were described. As those skilled in the art will appreciate, the software modules may be provided in compiled or uncompiled form and may be supplied to the UE 3, the (R)AN node 5, and the core network node as a signal over a computer network, or on a recording medium. Further, the functionality performed by part or all of this software may be performed using one or more dedicated hardware circuits. However, the use of software modules is preferred as it facilitates the updating of the UE 3, the (R)AN node 5, and the core network node in order to update their functionalities.

The above aspects are also applicable to 'non-mobile' or generally stationary user equipment.

Various other modifications will be apparent to those skilled in the art and will not be described in further detail here.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

Although the present invention has been described with reference to the exemplary embodiments, the present invention is not limited to the above. Various changes that can be understood by those skilled in the art can be made to the configuration and details of the present invention within the scope of the invention.

For example, the whole or part of the exemplary embodiments disclosed above can be described as, but not limited to, the following supplementary notes.

(Supplementary Note 1)

A network function node for Network Slice management and control, comprising:

means for receiving a message for quota on a network slice, from another network function node or an application function node; and means for sending information indicating a value for the quota on the network slice, to the another network function node or the application function node.

(Supplementary Note 2)

The network function node according to Supplementary note 1, wherein
the message includes at least one of:
a network slice identifier, ID, regarding the network slice,
a user equipment, UE, ID regarding the quota on the network slice,
a location ID indicating a geographical location,
a quota event ID indicating an event to be monitored on the network slice,
a type indicating at least one condition for notification on the quota on the network slice,
a threshold indicating a trigger for the notification, and
a periodicity indicating a time value for time between consequent periodical notification on the quota on network slice.

(Supplementary Note 3)

The network function node according to Supplementary note 2, wherein
the means for sending is configured to send the information indicating the value for the quota on the network slice, the network slice corresponding to the at least one of the network slice ID, the UE ID, the location ID, the quota event ID, the type of the notification, the threshold, and the periodicity.

(Supplementary Note 4)

The network node according to Supplementary note 2 or 3, wherein
the quota event ID indicates at least one of:
a max number of UEs per network slice to be monitored,
a max number of Protocol Data Unit, PDU, Sessions per network slice to be monitored, and
a max Uplink, UL, or Downlink, DL, data rate per network slice per UE to be monitored.

(Supplementary Note 5)

The network function node according to any one of Supplementary notes 2 to 4, wherein
the message includes the type, and
the means for sending is configured to send the information in a case where the at least one condition indicated by the type is satisfied.

(Supplementary Note 6)

The network function node according to Supplementary note 5, wherein
the message includes the threshold,
the type indicates that the notification is triggered in a case where the quota has reached to the threshold, and
the means for sending is configured to send the information in a case where the quota has reached to the threshold.

(Supplementary Note 7)

The network function node according to Supplementary note 5, wherein
the message includes the periodicity, and
the type indicates that the notification is triggered at expiry of the periodicity,
the means for sending is configured to send the information at expiry of the periodicity.

(Supplementary Note 8)

The network function node according to any one of Supplementary notes 1 to 7, wherein the means for sending is configured to send the information in response to the message.

(Supplementary Note 9)

A network function node for Network Slice management and control, comprising:
means for receiving a request message for updating quota on a network slice, from another network function node or an application function node;
means for updating the quota on the network slice based on the request message; and
means for sending a response message for confirming of the updating the quota on the network slice, to the another network function node or the application function node.

(Supplementary Note 10)

The network function node according to Supplementary note 9, wherein
the request message includes at least one of:
a network slice identifier, ID, regarding the network slice,
a user equipment, UE, ID regarding the quota on the network slice,
a location ID indicating a geographical location,
a quota event ID indicating an event to be updated on the network slice,
a value for updating the quota on the network slice, and
a flag indicating operation of updating the quota on the network slice.

(Supplementary Note 11)

The network function node according to Supplementary note 10, wherein
the quota event ID indicates at least one of:
a max number of UEs per network slice to be updated,
a max number of Protocol data Unit, PDU, Sessions per network slice to be updated, and
a max Uplink, UL, or Downlink, DL, data rate per network slice per UE to be updated.

(Supplementary Note 12)

The network function node according to any one of Supplementary notes 1 to 11, wherein
the means for receiving is configured to receive the message or the request message from the application function node via a Network Exposure Function node.

(Supplementary Note 13)

The network function node according to Supplementary note 12, wherein
the means for receiving is configured to receive the message or the request message in a case where a check, by the Network Exposure Function node, regarding authorization for the application function node to access to the network function node for querying for the quota on the network slice, is successful.

(Supplementary Note 14)

The network function node according to Supplementary note 12 or 13, wherein
the message or the request message includes a node name or an address of a specific network function node for Network Slice management and control, and
the means for receiving is configured to receive the message or the request message in a case where the node name or the address for the specific network function node corresponds to the network function node.

(Supplementary Note 15)

The network function node according to any one of Supplementary notes 1 to 14, wherein the message or the request message includes a location ID, and the means for receiving is configured to receive the message or the request message in a case where the location ID corresponds to the network function node.

(Supplementary Note 16)

The network function node according to any one of Supplementary notes 1 to 15, wherein the quota on the network slice includes at least one of:
the number of UEs per the network slice;
the number of PDU Sessions per the network slice; and
UL or DL data rate per network slice per UE.

(Supplementary Note 17)

An application function node for Network Slice management and control, comprising:

means for sending a message for quota on a network slice, to a network function node for Network Slice management and control;

means for receiving information indicating a value for the quota on the network slice, from the network function node for Network Slice management and control.

(Supplementary Note 18)

The application function node according to Supplementary note 17, wherein the message includes at least one of:
a network slice identifier, ID, regarding the network slice,
a user equipment, UE, ID regarding the quota on the network slice,
a location ID indicating a geographical location,
a quota event ID indicating an event to be monitored on the network slice,
a type indicating at least one condition for notification on the quota on the network slice,
a threshold indicating a trigger for the notification, and
a periodicity indicating a time value for time between consequent periodical notification on the quota on network slice.

(Supplementary Note 19)

The application function node according to Supplementary note 18, wherein the means for receiving is configured to receive the information indicating the value for the quota on the network slice, the network slice corresponding to the at least one of the network slice ID, the UE ID, the location ID, the quota event ID, the type of the notification, the threshold, and the periodicity.

(Supplementary Note 20)

The application function node according to Supplementary note 18 or 19, wherein the quota event ID indicates at least one of:
a max number of UEs per network slice to be monitored,
a max number of Protocol Data Unit, PDU, Sessions per network slice to be monitored, and
a max Uplink, UL, or Downlink, DL, data rate per network slice per UE to be monitored.

(Supplementary Note 21)

The application function node according to any one of Supplementary notes 18 to 20, wherein the message includes the type, and
the means for receiving is configured to receive the information in a case where the at least one condition indicated by the type is satisfied.

(Supplementary Note 22)

The application function node according to Supplementary note 21, wherein the message includes the threshold,
the type indicates that the notification is triggered in a case where the quota has reached to the threshold, and
the means for receive is configured to receive the information in a case where the quota has reached to the threshold.

(Supplementary Note 23)

The application function node according to Supplementary note 21, wherein the message includes the periodicity, and
the type indicates that the notification is triggered at expiry of the periodicity,
the means for receiving is configured to receive the information at expiry of the periodicity.

(Supplementary Note 24)

The application function node according to any one of Supplementary notes 17 to 23, wherein the means for receiving is configured to receive the information in response to the message.

(Supplementary Note 25)

An application function node for Network Slice management and control, comprising:

means for sending a request message for updating quota on a network slice, to a network function node for Network Slice management and control; and means for receiving a response message for confirming of the updating the quota on the network slice, from the network function node for Network Slice management and control, upon updating the quota on the network slice based on the request message.

(Supplementary Note 26)

The application function node according to Supplementary note 25, wherein the request message includes at least one of:
a network slice identifier, ID, regarding the network slice,
a user equipment, UE, ID regarding the quota on the network slice,
a location ID indicating a geographical location,
a quota event ID indicating an event to be updated on the network slice,
a value for updating the quota on the network slice, and
a flag indicating operation of updating the quota on the network slice.

(Supplementary Note 27)

The application function node according to Supplementary note 26, wherein the quota event ID indicates at least one of:
a max number of UEs per network slice to be updated,
a max number of Protocol Data Unit, PDU, Sessions per network slice to be updated, and
a max Uplink, UL, or Downlink, DL, data rate per network slice per UE to be updated.

(Supplementary Note 28)

The application function node according to any one of Supplementary notes 17 to 27, wherein the means for sending is configured to send the message or the request message to the network function node for Network Slice management and control via a Network Exposure Function node.

(Supplementary Note 29)

The application function node according to Supplementary note 28, wherein the means for sending is configured to send the message or the request message in a case where a check, by the Network Exposure Function node, regarding authorization for the application function node to access to the network function node for querying for the quota on the network slice, is successful.

(Supplementary Note 30)

The application function node according to Supplementary note 28 or 29, wherein
the message or the request message includes a node name or an address of a specific network function node for Network Slice management and control, and
the means for sending is configured to send the message or the request message in a case where the node name or the address for the specific network function node corresponds to the network function node.

(Supplementary Note 31)

The application function node according to any one of Supplementary notes 17 to 30, wherein
the message or the request message includes a location ID, and
the means for sending is configured to send the message or the request message in a case where the location ID corresponds to the network function node.

(Supplementary Note 32)

The application function node according to any one of Supplementary notes 17 to 31, wherein
the quota on the network slice includes at least one of:
the number of UEs per the network slice;
the number of PDU Sessions per the network slice; and
UL or DL data rate per network slice per UE.

(Supplementary Note 33)

A Network Exposure Function node comprising:
means for receiving a message for subscribing or updating quota on a network slice, from a network function node or an application function node;
means for authenticating whether the network function node or the application function node is authorized for subscription or update of the quota on the network slice;
means for selecting a network function node for Network Slice management and control in a case where the means for authenticating determines that an authentication is successful; and
means for forwarding the message to the network function node for Network Slice management and control.

(Supplementary Note 34)

The Network Exposure Function node according to Supplementary note 33, wherein
the message includes a node name or an address of a specific network function node for Network Slice management and control, and
the means for selecting is configured to select the network function node for Network Slice management and control based on the node name or the address of the specific network function node for Network Slice management and control.

(Supplementary Note 35)

The Network Exposure Function node according to Supplementary note 32 or 34, wherein
the message includes a location identifier, ID, and
the means for selecting is configured to select the network function node for Network Slice management and control corresponding to the location ID.

(Supplementary Note 36)

The Network Exposure Function node according to any one of Supplementary notes 33 to 35, wherein
the message includes a user equipment, UE, ID regarding the quota on the network slice, and the Network Exposure Function node further comprises:
means for mapping the UE ID to an internal UE ID for a network including the network function node for Network Slice management and control, wherein
the means for forwarding is configured to forward the message including the internal UE ID, to the network function node for Network Slice management and control.

(Supplementary Note 37)

A method for Network Slice management and control, comprising:
receiving a message for quota on a network slice, from another network function node or an application function node; and
sending information indicating a value for the quota on the network slice, to the another network function node or the application function node.

(Supplementary Note 38)

A method for Network Slice management and control, comprising:
receiving a request message for updating quota on a network slice, from another network function node or an application function node;
updating the quota on the network slice based on the request message; and
sending a response message for confirming of the updating the quota on the network slice, to the another network function node or the application function node.

(Supplementary Note 39)

A method for Network Slice management and control, comprising:
sending a message for quota on a network slice, to a network function node for Network Slice management and control;
receiving information indicating a value for the quota on the network slice, from the network function node for Network Slice management and control.

(Supplementary Note 40)

A method for Network Slice management and control, comprising:
sending a request message for updating quota on a network slice, to a network function node for Network Slice management and control; and
receiving a response message for confirming of the updating the quota on the network slice, from the network function node for Network Slice management and control, upon updating the quota on the network slice based on the request message.

(Supplementary Note 41)

A method for Network Exposure Function, comprising:
receiving a message for subscribing or updating quota on a network slice, from a network function node or an application function node;
authenticating whether the network function node or the application function node is authorized for subscription or update of the quota on the network slice;
selecting a network function node for Network Slice management and control in a case where the means for authenticating determines that an authentication is successful; and
forwarding the message to the network function node for Network Slice management and control.

This application is based upon and claims the benefit of priority from European provisional patent application No. EP20173721.0, filed on May 8, 2020, the disclosure of which is incorporated herein in its entirety by reference.

REFERENCE SIGNS LIST

1 System
3 Mobile device, UE
5 (R)AN node, Base station
7 Core network
11 NSQMC
12 NEF
13 AF/AS
20 External IP network
31 Transceiver circuit
33 Antenna
35 User interface
37 Controller
39 Memory
41 Operating system
43 Communications control module
51 Transceiver circuit
53 Antenna
55 Network interface
57 Controller
59 Memory
61 Operating system
63 Communications control module
71 Transceiver circuit
75 Network interface
77 Controller
79 Memory
81 Operating system
83 Communications control module

What is claimed is:

1. A core network node for managing and controlling a network slice, the core network node comprising:
at least one memory storing instructions; and
at least one processor configured to execute the instructions to:
receive, from an Access and Mobility Management Function (AMF) node, first network slice information;
receive, from a Network Exposure Function (NEF) node, a request message including second network slice information and an event ID; and
send, to the NEF node, a message including a number of user equipment (UEs) related to the network slice.

2. The core network node according to the claim 1, wherein the NEF node receives, from an Application Function (AF) node, the second network slice information and the event ID and sends, to the AF node, the number of the User Equipment (UEs).

3. A method for a core network node managing and controlling a network slice, the method comprising:
receiving, from an Access and Mobility Management Function (AMF) node, first network slice information;
receiving, from a Network Exposure Function (NEF) node, a request message including second network slice information and an event ID; and
sending, to the NEF node, a message including a number of user equipment (UEs) related to the network slice.

4. The method according to the claim 3, wherein the NEF node receives, from an Application Function (AF) node, the second network slice information and the event ID and sends, to the AF node, the number of the User Equipment (UEs).

* * * * *